Patented Nov. 3, 1953

2,657,985

UNITED STATES PATENT OFFICE 2,657,985

SATURATED HYDROCARBON COMPOSITIONS

Henry G. Schutze and Harry E. Cier, Baytown, Tex., assignors, by mesne assignments, to Standard Oil Development Company, Elizabeth, N. J., a corporation of Delaware No Drawing. Original application December 29, 1949, Serial No. 135,843. Divided and this application September 25, 1950, Serial No. 186,688

2 Claims. (Cl. 44—80)

The present invention is directed to improved compositions suitable for use as motor fuels. More particularly the invention is directed to motor fuel compositions comprising alkanes having branched structures.

This application is a division of U. S. Serial No. 135,843 filed December 29, 1949, in the names of Henry G. Schutze and Harry E. Cier and entitled "Branched Chain Compositions and Method of Preparing Same," now abandoned.

It is the main object of the present invention to produce a mixture of alkanes having branched structures which is suitable for use as an aviation or motor fuel.

Another object of the present invention is to provide a method for synthesizing a product comprising saturated branched chain hydrocarbons from a mixture of at least two saturated hydrocarbons.

A still further object of the present invention is to provide a process for reacting a mixture of at least two saturated hydrocarbons to produce a product having a molecular weight and structure different from that of the saturated hydrocarbons in the mixture.

The present invention may be described briefly as involving the reaction of at least two saturated hydrocarbons of different molecular structure by exposing the mixture to a resonance frequency radiation in the presence of a metal sensitizing agent at a reaction temperature and pressure to form a product having a branched structure. The invention particularly contemplates reacting saturated paraffinic hydrocarbons in a mixture containing at least two saturated hydrocarbons of different molecular weights and/or structure at a temperature in the range between 80° and 650° F. and at least atmospheric pressure to form a product having a molecular weight and structure different from that of the saturated hydrocarbons in the mixture. The product in itself forms an improved composition comprising a mixture of alkanes and particularly dimethyl, trimethyl and tetramethyl alkanes which is particularly suitable for use in motor fuels.

The invention is directed to employing at least two saturated hydrocarbons of different molecular structure having from two to six carbon atoms in the molecule whereby a product is obtained which contains from six to twelve carbon atoms in the molecule and comprising alkanes having from two to five methyl groups substituted for hydrogen.

In practicing the present invention the feed mixture is contacted in the presence of a metal sensitizing agent with a resonance frequency radiation sufficient to activate the weakest carbon-hydrogen bond in each molecule to cause the mixture of hydrocarbons to react and form a product having a different molecular weight and structure from that of the saturated hydrocarbons in the mixture. After the reaction has been completed the products which are primarily saturated hydrocarbons having a highly branched structure are separated from the metal sensitizing agent which is usually present in only small quantities, and the unconverted portion of the reaction product may, if desired, be subjected to contact with a metal sensitizing agent again and re-exposed to radiant energy to cause further reaction thereof.

The metal sensitizing agent employed in the present invention may be any metal which meets the conditions set out below, including proper vapor pressure, light absorption characteristics, and energy content in the activated state. Whatever metal sensitizer is employed it is incorporated in the reaction mixture of hydrocarbons, and the mixture is subjected to radiant energy containing frequencies which are capable of energizing the metal sensitizer. In selecting a metal sensitizer and a source of radiant energy for the reaction, the following conditions must be met:

(A) The vapor pressure of the metal employed as a sensitizer must be sufficient to insure that metal vapor is present in the hydrocarbon mixture in a concentration sufficient to absorb the activating light efficiently and to an extent that will permit rapid reaction to take place; conveniently, this vapor pressure is at least 0.001 mm. of mercury at a temperature below about 650° F.

(B) The radiant energy must be of a frequency that can be absorbed by the metallic sensitizer in its ground state in the hydrocarbon mixture. This frequency must correspond to at least one of the resonance lines of the metal sensitizer.

(C) The sum of the energy of the resonance frequency absorbed by the metal sensitizer and of the energy of the metal-hydrogen bond must correspond to an energy content equal to or in excess of that required to rupture one of the paraffin C-H bonds.

While a number of metal sensitizing agents will fill some of the foregoing requirements, the preferred metal sensitizing agents in carrying out our invention are the metals of subgroup B of group II of the periodic table, namely mercury, cadmium and zinc. While either of these metals may be employed in our process, mercury will be preferred because of its availability, vapor pressure, activation energy, and other peculiar properties.

In order to illustrate the resonance lines of the metallic sensitizers suitable for practice in the present invention, the following table is presented:

Table I

| Element | Resonance lines Å. |
|---|---|
| Hg | 2,537<br>1,850<br>3,261 |
| Cd | 2,289<br>3,076 |
| Zn | 2,139 |

The saturated hydrocarbons finding use in the present invention include, as pairs, ethane and propane, propane and isobutane, propane and n-butane, propane and n-pentane, propane and isopentane, n-butane and isopentane, n-butane and isobutane, isobutane and isopentane, propane and 2,2-dimethyl butane, propane and 2,3-dimethyl pentane, and many more pairs of saturated hydrocarbons too numerous to mention here, but illustrated by the foregoing pairs of reactants. In general, due to its relative inactivity, methane will not be a desirable reactant. However, our invention may be employed in methylation reactions, such, for example, as the reaction of methane and n-butane to produce isopentane.

The reaction may be conducted at a temperature in the range from about 80° to 650° F. and pressures may be substantially atmospheric and ranging upwardly therefrom. A preferred temperature range is from 100° to 400° F. The temperature and pressure within the range given will be selected to provide a vapor phase.

The process of the present invention is not limited to any particular type of equipment. The reaction has been carried out satisfactorily in an annular reactor consisting of a cylindrical outer Pyrex jacket provided with an inlet at one end and an outlet at the other end, the inner cylinder emanating light of the desired wave length. For example, when it is desired to employ mercury as the metallic sensitizer, a mercury vapor lamp emanating light of 2537 Å. wave length is inserted as a concentric inner cylinder in the Pyrex jacket. When employing mercury as a sensitizer, the lamp should be operated in such a manner that an unreversed 2537 Å. line is obtained. A satisfactory lamp for such a purpose is, for example, the General Electric 15 watt "T-8 Germicidal Lamp," or a lamp such as described in U. S. Patent 2,473,642 to Found et al.

When cadmium is used as the metallic sensitizer, a cadmium lamp may be employed. The reactor jacket may be surrounded with a suitable heating means such as an electric heater or a furnace. In converting the mixture of paraffinic hydrocarbons to other branched chain hydrocarbons, the paraffinic hydrocarbon feed is vaporized and introduced into the jacket through the inlet, and the products of reaction are withdrawn through the outlet. In carrying out a mercury-sensitized reaction a satisfactory method of maintaining mercury sensitizer in the reactor has been to place a small amount of metallic mercury into the reactor jacket prior to the beginning of the reaction. Other satisfactory methods of introducing metal sensitizer are known; for example, a carrier stream, consisting of the vaporized hydrocarbon feed, or a portion thereof, or an inert gas, such as nitrogen, may be passed through a vessel containing the metal sensitizer in the liquid or vapor state prior to passing said carrier stream into the reactor.

In preparing the feed stock for carrying out the process according to our invention, the conventional methods of purification, such as absorption or fractionation, may be employed. The two reactant paraffin hydrocarbons may be prepared in separate streams of high purity and combined in the desired proportion prior to being fed into the reactor. High purity reactant streams are, however, not essential to the carrying out of our invention. Particularly, it is not disadvantageous for the feed stream to contain compounds which are considerably less reactive at the reaction conditions employed than the reactants whose product is desired. It is contemplated that the feed mixture will contain at least two saturated hydrocarbons of different molecular structure. The molecular weight of the reacted hydrocarbons may be the same, but it is essential that the structure should be different. While it is preferred that the feed mixture contain only the two reactant hydrocarbons, actually in practice it may be desirable to have more than two hydrocarbons in the mixture. Thus the feed stock may contain, for example, propane and isobutane, as well as n-butane and all three of the hydrocarbons would then enter into the reaction. Attention should be paid to the exclusion of impurities which may react with the feed or sensitizer to produce undesirable contaminating compounds. For example, water vapor, in low concentration, may not be harmful to the mercury sensitizer, but it may oxidize cadmium. Reactive compounds other than the hydrocarbons desired to react will cause side reactions to take place which may form less desirable products. However, they may not cause the sensitizer to deteriorate.

The effluent leaving the reactor in which a process according to our invention is carried out may contain unconverted feed hydrocarbons as well as the branched chain product. The total effluent may be subjected to condensation to recover the feed and product in the liquid phase, and hydrogen and other non-condensibles in the gas phase. A part of the total liquid effluent may be recycled to the reactor to increase the yield of branched chain product from the original feed, and a part or all of the total liquid effluent may be subjected to fractional distillation in order to recover the branched chain hydrocarbon products in substantially pure form.

Actually, it may be desirable to recover the product as is and simply subject it to distillation to recover the unreacted hydrocarbons which may be recycled as mentioned before. It may be desirable not to separate the branched chain alkanes which are formed as a result of the improved reaction because the compounds as produced form an extremely desirable motor fuel. In fact, when the feed stock is propane and isobutane the product consists of 2,2,3-trimethylbutane, 2,2,3,3-tetramethylbutane and 2,2,3,3,4-pentamethylpentane with a minor amount of other materials. It will be seen that this mixture comprises triptane, a very desirable hydrocarbon, the solid octane, 2,2,3,3-tetramethylbutane, and the decane having five methyl groups. Unless the octane mentioned before is present in admixture with the other products it cannot be handled satisfactorily because it is a solid at ordinary temperatures and pressures. Therefore, it is desirable to recover the product comprising the aforesaid trimethyl and tetramethylbutane and the pentamethylpentane in admixture with each other. The same holds true for products produced from other feed mixtures in order to obtain the beneficial results therefrom. For example, when propane and isopentane comprise the feed mixture, the product would include at least two trimethylpentanes, dimethylbutane and dimethylhexane, all of which have desirable qualities for use in a motor fuel and it is desired that the product be used for such except for removal of unreacted hydrocarbons.

If the rate of flow through the reactor is such that appreciable quantities of the metal sensitizer are carried out of the reactor in the product stream, then it may be desirable to insert a device for recovering the metal sensitizer from the reactor effluent. This may be in the form of a condenser maintained at a low temperature or, in the case where mercury is the sensitizer metal, it may be a bed of a metal with which mercury may be amalgamated such, for example, as zinc or copper.

The invention will be further illustrated by the following examples in which feed mixtures were vaporized and heated to a reaction temperature and pressure and then introduced into the inlet of an annular reactor of which a mercury lamp formed the inner cylinder and a Pyrex glass jacket formed the outer cylinder. The lamp had an energy output of over 90% of the emitted radiation in the unreversed 2537 Å. line. A small amount of liquid mercury was present in the annulus to supply mercury vapor to the hydrocarbons to act as a metal sensitizer for the reaction. During the reaction the jacket was heated externally to maintain the reaction temperature. Pressures were substantially atmospheric. During the time the run was conducted the feed was continuously introduced at the inlet and product continuously withdrawn from the outlet. The reactor effluent was passed through condensers where the temperature was reduced to recover a liquid phase and a gas phase which were separately recovered and analyzed to determine their composition.

EXAMPLE I

In this run a feed mixture comprising propane and n-butane was vaporized and introduced into the reactor which was maintained at a temperature of 185° F. and 760 mm. pressure. The results of this run are presented in Table II.

Table II

| | |
|---|---|
| Light source | Mercury lamp. |
| Principal wave length, Angstroms | 2,537. |
| Metal sensitizer | Mercury. |
| Power input to lamp, watts | 15. |
| Power output of lamp, watts | 2.9. |
| Feed | 65% propane + 35% n-butane. |
| Reaction temperature, ° F | 185. |
| Reaction pressure, mm | 760. |
| Residence time, minutes | 4.0. |

| Composition of product: | Percent |
|---|---|
| 2,3-dimethylpentane | 75 |
| 3,4-dimethylhexane | |
| 2,3-dimethylbutane | |
| 3-methylhexane | 20 |
| 3-methylheptane | |
| $C_9 + C_{12}$ | |
| Olefins | 5 |

EXAMPLE II

A second run was made employing a feed mixture of isobutane and isopentane which was vaporized and passed through the reactor maintained at a reaction temperature of 155° F. and 760 mm. pressure. The product was recovered and analyzed. Conditions for the second run and an analysis of the product are presented in Table III.

Table III

| | |
|---|---|
| Light source | Mercury lamp. |
| Principal wave length, Angstroms | 2,537. |
| Metal sensitizer | Mercury. |
| Power input to lamp, watts | 15. |
| Power output of lamp, watts | 2.9. |
| Feed | Approx. 60% isobutane + 40% isopentane. |
| Reaction temperature, ° F | 155. |
| Reaction pressure, mm | 760. |
| Residence time, minutes | 6.75. |

| Composition of product: | Percent |
|---|---|
| 2,2,3,3-tetramethylpentane | 40 |
| 2,2,3,4-tetramethylpentane | 15 |
| 2,2,4-; 2,3,3-; and 2,2,5-trimethylhexanes | 15 |
| 2,2,3,3-tetramethylbutane | 10 |
| $C_9$ + paraffins and others | 20 |

EXAMPLE III

In this example runs were made with mixtures of propane and isobutane, propane and isopentane and n-butane and isobutane. The various feed mixtures were vaporized and passed through the reactor as has been described before. The product was recovered and analyzed. The results of these runs and the conditions under which the runs were conducted are shown in Table IV.

Table IV

| | |
|---|---|
| Light source | Mercury lamp. |
| Principal wave length, Angstroms | 2,537. |
| Metal sensitizer | Mercury. |
| Power input to lamp, watts | 15. |
| Power output of lamp, watts | 2.9. |

| Feed | 65% propane + 35% isobutane | | Approx. 70% propane + 30% isopentane mixture | | 65% n-butane + 35% isobutane | |
|---|---|---|---|---|---|---|
| Reaction temperature, ° F | 265 | | 269 | | 225 | |
| Reaction pressure, mm | 760 | | 762 | | 762 | |
| Residence time, minutes | 3.5 | | 3.5 | | 3.7 | |
| Composition of product | Component | Percent | Component | Percent | Component | Percent |
| | 2,2,3-trimethylbutane | 22 | 2,3,3-trimethylpentane | 35 | 2,2,3-trimethylpentane | 40 |
| | 2,2,3,3-tetramethylbutane | 43 | 2,3,4-trimethylpentane | 20 | 3,4-dimethylhexane | 15 |
| | 2,2,3,3,4-pentamethylpentane | 17 | 2,3-dimethylbutane | 10 | 2,2,3,3-tetramethylbutane | 5 |
| | Olefins | 3 | 2,4-dimethylhexane | 9 | 2,2-dimethylhexane | 5 |
| | Others | 15 | 2,5-dimethylhexane | | 2,4-dimethylhexane | 5 |
| | | | 3-methylheptane | 4 | 2-methylheptane | 4 |
| | | | 4-methylheptane | | 3-methylheptane | |
| | | | 3,3,4,4-tetramethylhexane | 3 | Olefins | 11 |
| | | | Olefins | 10 | Others | 15 |
| | | | Others | 9 | | |

EXAMPLE IV

In this example 50–50 mixtures of isobutane and isopentane were vaporized and passed through the reactor in the presence of mercury at a temperature in the range between 120° and 140° F. at varying feed rates. The products were collected and recovered and analyzed. The results of these three runs are presented in Table V wherein the operating data and the products composition are given.

Table V

| | | | |
|---|---|---|---|
| Light source | G. E. 30-watt mercury lamps. | | |
| Metal sensitizer | Mercury. | | |
| Power output of lamp @ 2537 Å., watts | 7.0. | | |
| Feed composition, mol. percent | 50 isobutane–50 isopentane. | | |
| Operating temperature, °F | 120–140. | | |
| Operating pressures, atmospheres | 1.0. | | |
| Feed rate, cc./min | 50 | 100 | 200 |
| Conversion, percent of charge | 10.1 | 5.2 | 3.0 |
| Mols. product per 4-hr. period | 0.027 | 0.028 | 0.032 |
| Product composition, mol. percent: | | | |
| 2,2,3,3-tetramethylpentane | 36 | 38 | 36 |
| 2,2,3,4-tetramethylpentane | 12.5 | 13.5 | 13.5 |
| 2,2,3,3-tetramethylbutane | 11.5 | 9.5 | 11.5 |
| Trimethylhexanes | 16 | 12 | 16 |
| Olefins | 2 | 10 | 2 |
| $C_9$+ paraffins and others | 22 | 17 | 21 |
| Bromine number of product | 4.6 | 10.2 | 3.5 |

In considering the runs represented in the several examples, it will be seen that the products vary in composition in accordance with the feed stock and that the product comprises mainly alkanes containing dimethyl, trimethyl, tetramethyl groups substituted on the hydrogens. Furthermore, it will be seen that when the feed stock was propane and isobutane, the ratio of trimethylbutane to tetramethylbutane to pentamethylpentane was approximately 2:4:2. Examination of the product in each of the several examples indicates that the alkanes having from 2 to 5 methyl groups substituted on the hydrogen atoms comprised approximately 60% by volume of the product. This in itself is advantageous and such a product will have a very high octane rating. One advantage from the present invention where tetramethylbutane is produced is the fact that the tetramethylbutane is produced in admixture with other branched hydrocarbons. The tetramethylbutane itself is a solid hydrocarbon which could not be handled ordinarily at ordinary temperatures and pressures, but in a mixture as shown in the several products in the different examples with other hydrocarbons the mixture is liquid and may be handled conventionally in fuel systems. The various products in themselves are unique in that they comprise essentially branched chain hydrocarbons to the substantial exclusion of straight chain hydrocarbons. Usually branched chain hydrocarbons are encountered in admixture with straight chain hydrocarbons and ordinarily the branched chain hydrocarbons encountered in the prior art are usually di- and trimethyl alkanes substituted for hydrogens in the molecule. In the practice of the present invention a composition having dimethyl, trimethyl, tetramethyl and even pentamethyl groups substituted on the hydrogen atoms is obtained.

The nature and objects of the present invention having been completely described and illustrated, what we wish to claim as new and useful and to secure by Letters Patent is:

1. A composition adapted for use as a motor fuel consisting of 2,2,3-trimethylbutane, 2,2,3,3-tetramethylbutane, and 2,2,3,3,4-pentamethylpentane in the approximate ratio of 2:4:2.

2. A composition adapted for use as a motor fuel consisting of a mixture of trimethyl butane, tetramethyl butane, and pentamethyl pentane in the approximate ratio of 2:4:2.

HENRY G. SCHUTZE.
HARRY E. CIER.

References Cited in the file of this patent

UNITED STATES PATENTS

| Number | Name | Date |
|---|---|---|
| 2,401,983 | Stanly et al. | June 11, 1946 |
| 2,406,667 | Clarke | Aug. 27, 1946 |

FOREIGN PATENTS

| Number | Country | Date |
|---|---|---|
| 465,459 | Great Britain | May 3, 1937 |
| 578,552 | Great Britain | July 3, 1946 |

OTHER REFERENCES

"Aviation Gasoline Manufacture," Van Winkle, 1st Edit., McGraw-Hill Book Co. Inc. (1944), pp. 48 and 49.